United States Patent [19]
Jeram et al.

[11] Patent Number: 5,082,886
[45] Date of Patent: Jan. 21, 1992

[54] LOW COMPRESSION SET, OIL AND FUEL RESISTANT, LIQUID INJECTION MOLDABLE, SILICONE RUBBER

[75] Inventors: Edward M. Jeram, Burnt Hills; Brian J. Ward, Valley Falls; Donald A. Martin, Clifton Park, all of N.Y.

[73] Assignee: General Electric Company, Waterford, N.Y.

[21] Appl. No.: 399,635

[22] Filed: Aug. 28, 1989

[51] Int. Cl.$^5$ .................................................. C08K 3/10
[52] U.S. Cl. .................................... 524/403; 524/779; 524/780; 524/433; 525/477; 528/15; 528/24; 528/31; 528/32
[58] Field of Search .............. 524/779, 780, 433, 403; 525/477; 528/15, 24, 31, 32

[56] References Cited

U.S. PATENT DOCUMENTS

| | | | |
|---|---|---|---|
| 3,436,366 | 4/1969 | Modie | 260/37 |
| 3,468,838 | 9/1969 | Loraine et al. | 260/37 |
| 3,821,140 | 6/1974 | Milbert | 260/185 |
| 3,865,778 | 2/1975 | Christie | 260/375 B |
| 3,884,866 | 5/1975 | Jeram et al. | 260/32.85 B |
| 3,957,713 | 5/1976 | Jeram et al. | 260/32.85 B |
| 4,052,357 | 10/1977 | Marinik | 260/275 B |
| 4,162,243 | 7/1979 | Lee et al. | 260/375 B |
| 4,260,536 | 4/1981 | Yonezawa et al. | 260/375 B |
| 4,340,709 | 7/1982 | Jeram et al. | 528/15 |
| 4,382,057 | 5/1983 | Tolentino | 269/328.2 |
| 4,427,801 | 1/1984 | Sweet | 523/212 |
| 4,500,589 | 2/1985 | Modie | 428/145 |
| 4,525,528 | 6/1985 | Bush et al. | 528/24 |
| 4,539,357 | 9/1985 | Bobear | 528/24 |
| 4,806,592 | 2/1989 | Saruyama | 524/860 |

*Primary Examiner*—Paul R. Michl
*Assistant Examiner*—Karen A. Hellender
*Attorney, Agent, or Firm*—Mark R. Warfield

[57] ABSTRACT

There is provided an organopolysiloxane composition having low compression set as well as fuel and oil resistance in addition to high strength, good elongation, and tear comprising:

(A) 100 parts of a first component comprising:
  (1) a vinyl-containing liquid organopolysiloxane or a blend of vinyl-containing liquid polysiloxanes;
  (2) optionally, filler; and
  (3) a catalyst; and
(B) from 1 to 100 parts, based on 100 parts of (A), of a hydrogen silicone composition selected from the class consisting of hydrogen containing silanes and hydrogen containing polysiloxanes and mixtures of hydrogen containing polysiloxanes with fillers and high viscosity polysiloxanes;
(C) optionally, magnesium oxide to impart oil resistance;
(D) optionally, an MQ resin to impart fuel resistance; and
(E) optionally, a cerium containing compound or, alternatively, tetramethyldivinyldisilazane to impart low compression set.

14 Claims, No Drawings

LOW COMPRESSION SET, OIL AND FUEL RESISTANT, LIQUID INJECTION MOLDABLE, SILICONE RUBBER

The present invention relates to liquid injection moldable (LIM) silicone elastomers having low compression set and resistance to fuels and oil. This invention further relates to different catalyst systems used to effect final cure. More particularly, the present invention relates to an organopolysiloxane elastomer which is prepared through an SiH olefin addition reaction in the presence of a catalyst to result in an elastomer with high tensile strength, good elongation and high tear as well as the properties noted above.

BACKGROUND OF THE INVENTION

Silicone elastomers can be made from many different polyorganosiloxanes, cure mechanisms and fillers. These silicone elastomers have been made from stiff gum polymers as well as water thin fluids. The curing mechanisms have ranged from organic peroxides to moisture sensitive means to radiation. A variety of fillers have also been used, such as reinforcing silica fillers and extending fillers.

Presently, silicone elastomeric compositions are usually prepared from a vinyl-containing polydiorganosiloxane, an organohydrogensilicone crosslinker, a platinum catalyst, and, optionally, fillers. The compositions of this type are desirable for many reasons. For instance, they cure without by-products; thus, there is no need for stripping or devolitilization. They can cure at room temperature or at elevated temperatures. They can be stabilized for storage at room temperature by utilization of a platinum catalyst inhibitor. And, they can be made from high and low viscosity polymers. These compositions utilize components that are low enough in viscosity that they are easily pumpable or extrudable as well as have a fast cure time. These compositions also provide cured silicone elastomers which are characterized by high strength and high durometer.

These platinum catalyzed silicone elastomers are generally two package systems. One package generally contains the base polymer (which itself contains vinyl unsaturation) and the platinum catalyst. The other package generally contains the base polymer and the organohydrogensilicone. When the two packages are mixed together, the platinum catalyzes the addition of the organohydrogensilicone to the vinyl containing base polymer. Heat sensitive inhibitors are generally used to prevent the catalyst from polymerizing the composition at room temperature. Elevated temperatures are then employed to neutralize the inhibitor and allow the reaction to proceed.

The problems with these silicone elastomers, however, is their relatively high compression set which has prevented such elastomers from being used in sealing applications where high temperature resiliency is an important factor. An example of this would include automotive gasketing and similar applications. The compression set of LIM silicone elastomers is generally well above that useful for applications such as gasketing. This problem with compression set stems from the LIM process itself. In order to decrease cycle times, molders will remove the elastomer from the mold prior to final cure. Therefore, in order to improve compression set, another step, post bake, is required where the elastomer is further cross-linked by heating.

In addition, automotive gasket applications would also require the use of a gasket material that also has fuel and oil resistance as well as low compression set without any sacrifice of durometer or strength. Silicone elastomers, however, are not known for their fuel/oil resistance.

Further, although platinum catalyzed addition reactions are possible at room temperature, inhibitors are often employed to stabilize the compositions until needed. These inhibitors are heat sensitive and are designed to be ineffective at elevated temperatures. Molders of these products, however, are requiring lower and lower reaction temperatures in their processes, requiring development of reaction mechanisms which are still stable at room temperature yet will react at only moderately elevated temperatures. Finally, molders also would like to see a one-part composition that requires no mixing of the catalyst and organohydrogensilicone crosslinker.

Accordingly, it is highly desirable to have a silicone rubber composition which cures quickly, if desired, at elevated temperatures and would require no post baking as is traditional with heat vulcanizable silicone rubber compositions.

It is also desirable to prepare a silicone rubber composition which can be injection molded. Most silicone rubber compositions and particularly heat vulcanizable silicone rubber compositions, because of their high viscosity, are very difficult to injection mold and require excessively high pressure such as, 40,000 psi and even higher. In addition, such heat vulcanizable silicone rubber compositions are difficult to injection mold so as to form intricate parts. They require special molds that are to be used in the injection molding process as well as long times to cure at elevated temperatures.

Accordingly, it is one object of the present invention to provide a liquid injection moldable (LIM), elastomeric silicone rubber composition which in the cured state has a combination of low compression set and resistance to fuel and oil as well as high tensile strength, high elongation, and high tear.

It is further an object of this invention to provide an elastomeric silicone rubber composition which requires no post bake step.

It is further an object of this invention to provide a one part LIM elastomeric composition.

It is further an object of this invention to provide an elastomeric silicone rubber composition which cures at a temperature lower than is normally used to cure such compositions.

These and other objects of the present invention are accomplished by means set forth hereinbelow.

SUMMARY OF THE INVENTION

There is provided by the present invention an organopolysiloxane composition having low compression set as well as fuel and oil resistance in addition to high strength, good elongation, and tear comprising:
 (A) 100 parts of a first component comprising:
  (1) a vinyl-containing liquid organopolysiloxane or a blend of vinyl-containing liquid polysiloxanes;
  (2) optionally, filler; and
  (3) a catalyst; and
 (B) from 1 to 100 parts, based on 100 parts of (A), of a hydrogen silicone composition selected from the class consisting of hydrogen containing silanes and hydrogen containing polysiloxanes and mixtures of hydrogen containing polysiloxanes with fillers and high viscosity polysiloxanes;

(C) optionally, magnesium oxide to impart oil resistance;

(D) optionally, an MQ resin to impart fuel resistance; and (E) optionally, a cerium containing compound or, alternatively, tetramethyldivinyldisilazane to impart low compression set.

DETAILED DESCRIPTION OF THE INVENTION

The vinyl containing organopolysiloxane, component (A)(1), is preferably a linear, vinyl terminated polyorganosiloxane or a mixture of (a) high and (b) low viscosity vinyl-containing polysiloxanes. The high viscosity, vinyl containing polysiloxane, herein component (A)(1)(a), is an organopolysiloxane or a blend of organopolysiloxanes having no more than 25 mole percent phenyl radicals and having a viscosity of 5,000 to 1,000,000 centipoise at 25° C. The polymer is represented by the following formula:

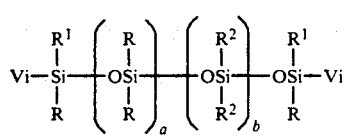
(I)

wherein Vi stands for vinyl, $R^1$ is selected from the class consisting of lower alkenyl, alkyl and aryl radicals and R is selected from the class consisting of monovalent hydrocarbon radicals and halogenated monovalent hydrocarbon radicals, $R^2$ is selected from the class consisting of alkyl, alkenyl, and aryl radicals, "a" varies from 100 to 10,000 and "b" varies from 0 to 300. This organopolysiloxane or blend of organopolysiloxanes comprises 20 to 90 parts by weight of component (A). Such a polymer is taught by Jeram et al. in U.S. Pat. No. 3,884,866; Lee et al. in U.S. Pat. No. 4,162,243; Jeram et al. in U.S. Pat. No. 4,340,709; Tolentino in U.S. Pat. No. 4,382,057; and Sweet in U.S. Pat. No. 4,427,801; hereby incorporated by reference.

The low viscosity, vinyl containing organopolysiloxane, herein component (A)(1)(b), is an organopolysiloxane or a blend of organopolysiloxanes having a vinyl content that may vary from 0.01 mole percent vinyl to 60 mole percent vinyl and a viscosity that varies from 50 to 5,000 centipoise at 25° C. and having no more than 25 mole percent phenyl radicals. This polymer is represented by the formula:

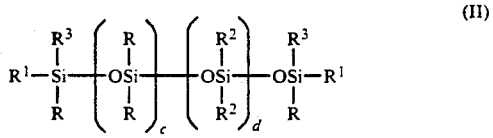
(II)

wherein R, $R^1$, and $R^2$ are as previously defined, $R^3$ is selected from the class consisting of alkyl, aryl and alkenyl radicals, "c" varies from 0 to 500 and "d" varies from 0 to 200. This organopolysiloxane or blend of organopolysiloxanes comprises 20 to 90 parts by weight of component (A). Such a polymer is taught by Jeram et al. in U.S. Pat. Nos. 3,884,866 and 4,340,709, and in copending U.S. patent application Ser. No. 07/285,340.

filed 12/19/88 assigned to the same assignee as the present application; all hereby incorporated by reference.

The filler, component (A)(2), is any reinforcing or extending filler known in the prior art. In order to get the high tensile strength, for example, a reinforcing filler is incorporated. Illustrative of the many reinforcing fillers which can be employed are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, etc.

Preferably, the filler is either a fumed or precipitated silica that has been treated. The treating process may be done in accordance with the teachings of Evans et al. in U.S. Pat. No. 4,529,774; Smith in U.S. Pat. No. 3,635,743; and Beers in U.S. Pat. No. 3,847,848; hereby incorporated by reference. Alternatively, and most preferably, the filler is treated in-situ; that is the untreated silica filler and the treating agents are added to the silicone elastomer composition separately, and the treatment process is accomplished simultaneously with the mixture of the filler into the elastomer. This in-situ process is taught by Evans in U.S. Pat. No. 4,529,774; hereby incorporated by reference.

Alternatively, components (A)(1)(b) and (A)(2) may be replaced by the vinyl treated silica filler of Lee et al. in U.S. Pat. No. 4,162,243; and Sweet in U.S. Pat. No. 4,427,801; hereby incorporated by reference.

The catalyst, component (A)(3), is any catalyst that promotes the hydrosilation reaction between a silicon hydride and an ethylenically unsaturated polyorganosiloxane. Typically, component (A)(3) is a precious metal catalyst; usually platinum. Such catalysts are well known in the art. Preferred catalysts are taught by Lamoreaux in U.S. Pat. Nos. 3,917,432; 3,197,433; and 3,220,972; and by Karstedt in U.S. Pat. Nos. 3,715,334 and 3,814,730; and by Ashby et al. in U.S. Pat. No. 4,288,345; hereby incorporated by reference. The use of platinum, however, necessitates a post bake step, because platinum does not decompose and will continue to crosslink as long as residual amounts of vinyl and silicon hydride exist in the elastomer.

Alternatively, the catalyst, component (A)(3), may be a peroxide or it may be a combination of peroxides comprising a low temperature peroxide and a high temperature peroxide. In the molding of silicone LIM compositions, typical molding temperatures are usually about 400° F. Under such conditions a single peroxide catalyst may be used. However, molding cycle times necessary to achieve final cure in the mold are considered to be excessive. To decrease cycle times, therefore, molders will remove the composition from the mold prior to complete cure, necessitating a post bake step to achieve final cure. This post bake step is necessary because residual peroxide catalyst in the material will continue to catalyze the reaction until the peroxide catalyst has decomposed to noncatalytic products, as determined by the temperature "half-life" of the peroxide.

Those skilled in the art are aware that different peroxides will decompose at different activation temperatures to catalyze a particular reaction. It is also known that the catalytic life of a peroxide is inversely proportional to the temperature to which the peroxide is exposed. As the temperature increases above its activation temperature, the catalytic lifespan of the peroxide will decrease.

In order to decrease cycle times yet still be able to eliminate the post bake step, it has been found preferable to use a combination of peroxide catalysts comprising a high temperature peroxide catalyst and a low temperature peroxide catalyst. The function of the low temperature peroxide catalyst is to quickly catalyze the reaction at the molding temperature and allow the material to achieve a degree of crosslinking such that the material retains its shape after removal from the mold. Thus, the low temperature peroxide achieves partial crosslinking at the mold temperature in a very short period of time.

The high temperature peroxide catalyst uses the residual heat of the silicone elastomer after it has been removed from the mold to continue crosslinking to final cure. Thus, since the material continues to crosslink at low temperatures, i.e. lower than molding temperatures, the post bake step becomes unnecessary.

By the terms "low temperature peroxide" and "high temperature peroxide", reference is being drawn to the temperature half life of the peroxide. It is preferable that the high temperature peroxide have a ten hour half life at greater than 110° C. It is also preferable that the low temperature peroxide have a ten hour half life at 110° C. or less. It is more preferable that the high temperature peroxide have a ten hour half life at 115° C. or greater and the low temperature peroxide have a ten hour half life at 100° C. or less.

It has been found that using a combination of a low and a high temperature peroxide catalysts imparts unusually low compression set values to the cured silicone elastomer without sacrifice of durometer, tensile, or elongation. It has also been found that molding temperatures may be decreased if the low temperature peroxide catalyst itself activates at lower temperatures. That is, molding has been accomplished at a temperature as low as 350° F. while maintaining a low compression set. There is no reason that molding may not be accomplished at still lower temperatures as long as the proper high and low temperature peroxides are chosen.

It is preferable that the peroxides chosen do not decompose into acids. Acid decomposition products have been found to adversely affect compression set. It has been found that 1,1-Bis(T-butyl peroxy)-3,3,3-trimethylcyclohexane works well as the low temperature peroxide catalyst. It has also been found that 2,5-dimethyl-2,5,-di(T-butyl peroxy) hexane works well as the high temperature peroxide catalyst.

The determination of whether to use a precious metal catalyst or a peroxide catalyst is dependent upon the LIM process and the specifications of the molder. A precious metal catalyst has an advantage in that there are no by-products from the hydrosilation reaction between the vinyl containing polysiloxane, component (A)(1), and the silicon hydride, component B. The disadvantage to this type of system, though, necessitates the separation of either the vinyl containing polysiloxane or the silicon hydride from the catalyst in order to prevent premature polymerization. Since the components are separated, a molder must accomplish a mixing step immediately prior to use.

The advantage of using a peroxide catalyst is that, since peroxides are heat activated, all the ingredients can be mixed together and stored at room temperature without polymerizing. Thus, peroxide catalytic systems may be used as one-part systems and molders need not worry about the mixing step necessary in precious metal catalytic systems. The disadvantage to using peroxides, however, is the fact that they decompose over time to products that may or may not be troublesome to a particular molder.

The hydrogen silicone composition, component (B), contains an amount of Si-H groups than can range from a complete absence (in the case of some peroxide cure systems) to an excess over the number of vinyl groups in the entire silicone elastomer composition. Although the hydrogen containing material may be a silane, it is most advantageous to use an Si-H containing polysiloxane resin or polysiloxane linear polymer.

Thus, in one embodiment of the present invention, the Si-H material of component (B) may be a polysiloxane resin containing monofunctional (M) siloxane units of the formula $H(R^4)_2Si)_{1/2}$ and tetrafunctional (Q) siloxane units of the formula $SiO_{4/2}$ where the ratio of M units to Q units may vary from 10:1, and is preferably about 2:1. Also, $R^4$ is preferably a lower alkyl of from 1 to 8 carbon atoms such as methyl, ethyl, etc.

Another embodiment of the present invention utilizes an Si-H containing linear polysiloxane polymer represented by the formula:

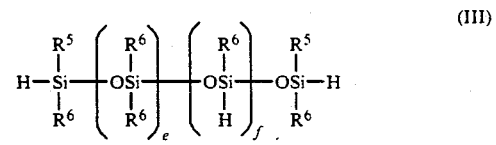

(III)

wherein $R^5$ is selected from the group consisting of hydrogen, monovalent hydrocarbon radicals, and halogenated monovalent hydrocarbon radicals; $R^6$ is selected from the class consisting of monovalent hydrocarbon radicals and halogenated monovalent hydrocarbon radicals; "e" varies from 1 to about 1,000; and "f" varies from about 5 to about 200. More preferably, "e" varies from about 10 to about 500 and "f" varies from about 5 to about 200. Such a polymer is taught by Jeram et al. in U.S. Pat. No. 3,884,866; Lee et al. in U.S. Pat. No. 4,162,243; and Sweet in U.S. Pat. No. 4,427,801; hereby incorporated by reference.

The magnesium oxide, component (C), is used to impart oil resistance to the elastomer. The magnesium oxide is preferably finely divided and is added in an amount up to 10 parts by weight per 100 parts components (A) and (B). More preferably, the amount will range from about 1 to about 8 parts by weight of component (A). The magnesium oxide should be added to the composition prior to curing the elastomer. It should be noted that, since magnesium oxide is a known filler, if added in amounts greater than 10 parts it will act more like a filler than an oil resistant additive.

The MQ resin, component (D), imparts fuel resistance to the cured elastomer. Accordingly, there may be present in the composition per 100 parts of the base vinyl-containing diorganopolysiloxane gum blend from 1 to 50 parts by weight of an organopolysiloxane resinous copolymer having therein $R_3^7SiO_{0.5}$ monofunctional units and $SiO_2$ tetrafunctional units, where $R^7$ is a member selected from a class of vinyl radicals and monovalent hydrocarbon radicals free of aliphatic unsaturation where the ratio of monofunctional units to tetrafunctional units being from 0.5 to 1 to 1 to 1, and from where about 2.5 to 10 mole percent of the silicon atoms contain silicon bonded vinyl groups. The radical $R^7$ can also be any of the radicals given for the radical of $R^1$ in Formula (1). It should be noted further that this resin should not contain any hydride groups in it.

There can also be utilized in the resin difunctional siloxy units. Accordingly, per 100 parts of components (A) and (B) there may be incorporated into the composition from 20 to 50 parts by weight of an organopolysiloxane resinous copolymer comprising $R_3^7SiO_{0.5}$ monofunctional units and $SiO_2$ tetrafunctional units and $R_2^7SiO$ difunctional units, where $R^7$ is a member selected from a class consisting of vinyl radicals and monovalent hydrocarbon radicals free of aliphatic unsaturation where the ratio of monofunctional units to the tetrafunctional units is 0.5 to 1 to 1 to 1 and the difunctional units that are preferably present in amount equal to about 1 to 10 mole percent based on the total number of moles of siloxy units in the copolymer and wherein the resinous copolymer contains from about 2.5 to 10 mole percent of vinyl groups.

Such a resinous copolymer can be present in the composition in the foregoing quantities indicated above, and more preferably, at the concentration of 5 to 25 parts by weight per 100 parts of the base vinyl-containing diorganopolysiloxane gum blend. It has been found that such vinyl-containing resins produce good fuel resistance as well as good strength. Such resins are known and are produced by methods well known in the art and can be utilized within the prescribed above quantities with good results. Further, such resins are usually produced by hydrolysis of the appropriate chlorosilanes which method is well known in the art. For further information as to such resins, one is referred to the disclosure of Modic, U.S. Pat. No. 3,436,366; herein incorporated by reference.

The cerium containing compound, component (E), imparts low compression set to the silicone LIM elastomer. Even though the use of a dual peroxide catalytic system (component (A)(3)) imparts low compression set, the use of magnesium oxide (component (C)) will adversely affect this and cause an increase in compression set. It has been found, however, that the use of magnesium oxide may be offset by using a cerium containing compound. It is theorized that cerium will complex with the silicone polymer, the filler, or both to improve the compression set of the silicone elastomer.

What has been found to be particularly useful in this regard has been cerium hydroxide ($Ce(OH)_4$). In order to work, however, it is necessary for the cerium hydroxide to undergo a heating step in order to drive off water and allow the cerium to complex with the silicone.

There is no limit to the amount of cerium hydroxide that may be added to impart low compression set. An excess will not negatively affect compression set values. It should be noted, however, that if added in amounts greater than 10 parts per 100 parts of components (A) and (B) the cerium hydroxide will act more like a filler than a low compression set additive.

An alternative to using cerium hydroxide involves the use of tetramethyldivinyldisilazane to impart low compression set. In order to impart low compression set, there should be added from about 0.1 to about 10 parts by weight tetramethyldivinyldisilazane per 100 parts components (A) and (B). Preferably, there is added from about 0.1 to about 1 part by weight tetramethyldivinyldisilazane per 100 parts components (A) and (B).

In order to demonstrate various features of this invention, the following examples are submitted. They are for illustrative purposes and are not intended to limit in any way the scope of this invention.

A vinyl-containing liquid silicone polymer was prepared according to the teachings of this invention using the formulation of Table I.

TABLE I

| Formulation of Uncured Silicone Elastomer | |
|---|---|
| | Parts |
| Vinyl-containing polymer/resin blend | 100 |
| HMDZ treated fumed silica | 20 |
| Minusil ® (5 micron) | 10 |

In order to demonstrate the effect of a dual peroxide catalytic system on compression set, three examples were prepared according to the formulations of Table II (all amounts are in parts). The VCS component is the vinyl-containing silicone of Table I.

TABLE II

| Dual Peroxide Catalytic System | | | |
|---|---|---|---|
| | EXAMPLES | | |
| Component | 1 | 2 | 3 |
| VCS | 100.0 | 100.0 | 100.0 |
| $Ce(OH)_4$ | 0.5 | 0.5 | 0.5 |
| Magnesium oxide | 0.5 | 0.5 | 0.5 |
| Si—H crosslinker | 2.35 | 2.35 | 2.6 |
| Low temp peroxide | 0.5 | 0.4 | 0.4 |
| High temp peroxide | 0.0 | 0.1 | 0.1 |

Magnesium oxide and $Ce(OH)_4$ were dispersed into the VCS. Then 30 psi steam and vacuum was applied to the mixture for 2 hours and, afterward, the mixture was cooled to room temperature and the vacuum then removed. The Si-H cross-linker was then added and mixed for 15 minutes. The peroxides were then added and mixed for 15 minutes and then a vacuum was applied for 15 minutes.

The elastomers obtained from Examples 1 through 3 were each molded at 350° F. for twelve minutes. Table III summarizes the testing of physical properties of the elastomers after molding for each example.

TABLE III

| Physical Properties of Dual Peroxide Cure | | | |
|---|---|---|---|
| | EXAMPLE | | |
| Test | 1 | 2 | 3 |
| Monsanto Rheometer | | | |
| 3 minute Max | 89.2 | 98.2 | 105.0 |
| T-90 | 80.3 | 88.4 | 94.5 |
| Time (seconds) | 108.0 | 123.0 | 111.0 |
| Shore A | 60 | 62 | 62 |
| Elong % | 322 | 390 | 396 |
| Tensile psi | 919 | 1089 | 1095 |
| Tear psi | 256 | 261 | 273 |
| 100% Mod. | 544 | 611 | 630 |
| Compression Set * | 21 | 13 | 15 |

EXAMPLES 4-7

In order to demonstrate the effect of magnesium oxide on oil resistance, MDQ resin on fuel resistance, and cerium and tetramethyldivinyldisilazane (TMDVDS) on compression set, three silicone LIM formulations were prepared as Examples 4, 5, and 6. The formulations for each example are summarized in Table IV (all amounts are in parts).

TABLE IV

Formulations of Examples 4-6

| Component | EXAMPLE 4 | 5 | 6 |
|---|---|---|---|
| Vinyl polymer (low vis) | 70.5 | 57.7 | 57.7 |
| MDQ resin | 0.0 | 19.2 | 19.2 |
| Fumed silica (HMDZ) | 0.0 | 15.4 | 15.4 |
| Fumed silica (D4) | 27.0 | 0.0 | 0.0 |
| Ce(OH)$_4$ | 0.0 | 0.0 | 0.5 |
| Magnesium oxide | 0.0 | 0.5 | 0.5 |
| Si—H crosslinker | 2.8 | 2.3 | 2.3 |
| TMDVDS | 0.0 | 0.3 | 0.0 |
| Platinum catalyst | 15 ppm | 15 ppm | 15 ppm |
| Inhibitor | 0.4 | 800 ppm | 800 ppm |
| HMDZ | 6.0 | 1.97 | 0.0 |
| Water | 3.0 | 0.5 | 0.0 |
| Vi(EtO)$_3$Si | 1.0 | 0.0 | 0.0 |
| Extending filler | 0.0 | 7.7 | 7.7 |

Normally liquid injection compounds are two component materials sold as a 1/1 A/B mix ratio product. The above formulations of Examples 4, 5, and 6 show the total final composition when A+B parts are mixed together.

Example 4 represents a standard silicone LIM compound. It was molded at 400° F. and cured for 12 minutes followed by a 4 hour post bake. Table V summarizes the physical properties for Example 5 after each step.

TABLE V

Physical Testin of Standard LIM (Example 4)

| | 12 min. | PB - 4 hrs |
|---|---|---|
| Shore A | 47 | 50 |
| Elong, % | 584 | 522 |
| Tensile, psi | 1210 | 1184 |
| Tear, psi | 247 | 260 |
| Compression set | 75 | 22 |

Examples 5 and 6 were likewise molded at 400° F. for twelve minutes. No post bake was done. The results of the physical property testing is summarized in Table VI.

TABLE VI

Physical Testing of Examples 5 and 6

| Test | EXAMPLE 5 | 6 |
|---|---|---|
| Shore A | 56 | 54 |
| Elong % | 649 | 625 |
| Tensile psi | 1128 | 1130 |
| Tear, psi | 205 | 223 |
| Compression Set * | 22 | 18 |

After curing the elastomers of Examples 4, 5 and 6, each was then immersed for 168 hours and 300° F. in #1 oil, #2 oil, and #3 oil. After removal from the oils, the physical properties were then tested. Tables VII, VIII, and IX summarize the changes in physical properties for each of the examples.

TABLE VII

Changes in Physical Properties After Immersion in #1 Oil

| Test | EXAMPLE 4 | 5 | 6 |
|---|---|---|---|
| Shore A (change) | −18.0 | −5.0 | −2.0 |
| Elong (% change) | −83.0 | −39.0 | −36.0 |
| Tensile (% change) | −84.0 | −38.0 | −32.0 |
| % volume swell | +5.6 | +7.0 | +5.0 |

TABLE VIII

Changes in Physical Properties After Immersion in #2 Oil

| Test | EXAMPLE 4 | 5 | 6 |
|---|---|---|---|
| Shore A (change) | −20.0 | −7.0 | −5.0 |
| Elong (% change) | −31.0 | −33.0 | −15.0 |
| Tensile (% change) | −23.0 | −34.0 | −17.0 |
| % volume swell | +54.0 | +13.0 | +9.0 |

TABLE IX

Changes in Physical Properties After Immersion in #3 Oil

| Test | EXAMPLE 4 | 5 | 6 |
|---|---|---|---|
| Shore A (change) | material | −12.0 | −18.0 |
| Elong (% change) | too weak | −78.0 | −84.0 |
| Tensile (% change) | to obtain | −82.0 | −81.0 |
| % volume swell | readings | +37.0 | +37.0 |

In addition, each of the cured elastomers in Examples 4, 5 and 6 was then immersed for 48 hours at room temperature in gasohol and in fuel C. After removal from the fuels, the physical properties were then tested. Tables X and XI summarize the changes in physical properties for each of the examples in each of the fuels.

TABLE X

Changes in Physical Properties After Immersion in Gasohol

| Test | EXAMPLE 4 | 5 | 6 |
|---|---|---|---|
| Shore A (change) | −16.0 | −18.0 | −14.0 |
| Elong (% change) | −82.0 | −86.0 | −82.0 |
| Tensile (% change) | −68.0 | −73.0 | −66.0 |
| % volume swell | +190.0 | +167.0 | +157.0 |

TABLE XI

Changes in Physical Properties After Immersion in Fuel C

| Test | EXAMPLE 4 | 5 | 6 |
|---|---|---|---|
| Shore A (change) | −17.0 | −15.0 | −12.0 |
| Elong (% change) | −85.0 | −83.0 | −81.0 |
| Tensile (% change) | −65.0 | −64.0 | −59.0 |
| % volume swell | +237.0 | +180.0 | +172.0 |

As can be seen from the above data, standard methyl silicone LIMS, represented by Example 4, have poor oil and fuel resistance and require post bake in order to obtain good compression set.

What is claimed is:

1. A liquid, injection moldable silicone composition comprising:
   (A) 100 parts of a first component comprising:
      (1) a blend of vinyl-containing liquid polysiloxanes comprising:
         (a) a high viscosity vinyl-containing organopolysiloxane having a viscosity of from 5000 to 1,000,000 centipoise at 25° C.; and
         (b) a low viscosity vinyl-containing organopolysiloxane having a viscosity of from 50 to 5000 centipoise at 25° C.;
      (2) filler; and
      (3) a platinum catalyst;
   (B) from 1 to 100 parts, based on 100 parts of (A), of a hydrogen silicone composition selected from the class consisting of hydrogen containing silanes and hydrogen containing polysiloxanes;

(C) magnesium oxide;
(E) cerium hydroxide or tetramethyldivinyldisilazane; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

2. A composition according to claim 1 wherein the high viscosity vinyl-containing polysiloxane has no more than 25 mole percent phenyl radicals and has the formula

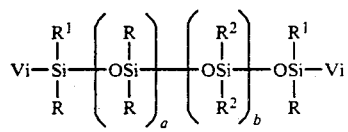

wherein Vi stands for vinyl, $R^1$ is selected from the class consisting of lower alkenyl, alkyl, and aryl radicals and R is selected from the class consisting of monovalent hydrocarbon radicals and halogenated monovalent hydrocarbon radicals, $R^2$ is selected from the class consisting of alkyl, alkenyl, and aryl radicals, "a" varies from 100 to 10,000 and "b" varies from 0 to 300; and the low viscosity vinyl-containing has no more than 25 mole percent phenyl radicals and has the formula

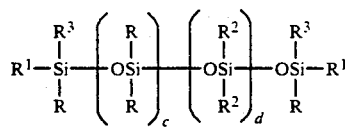

wherein R, $R^1$, and $R^2$ are as previously defined, $R^3$ is selected from the class consisting of alkyl, aryl, and alkenyl radicals, "c" varies from 0 to 500 and "d" varies from 0 to 200.

3. A composition according to claim 1 wherein the magnesium oxide is present at from about 1 to about 8 parts by weight of component (A).

4. A liquid, injection moldable silicone composition comprising:
(A) 100 parts of a first component comprising:
(1) a blend of vinyl-containing liquid polysiloxanes comprising:
(a) a high viscosity vinyl-containing organopolysiloxane having a viscosity of from 5000 to 1,000,000 centipoise at 25° C.; and
(b) a low viscosity vinyl-containing organopolysiloxane having a viscosity of from 50 to 5000 centipoise at 25° C.;
(2) filler; and
(3) a peroxide catalyst; and
(B) from 1 to 100 parts, based on 100 parts of (A), of a hydrogen silicone composition selected from the class consisting of hydrogen containing silanes and hydrogen containing polysiloxanes;
(C) magnesium oxide;
(E) cerium hydroxide or tetramethyldivinyldisilazane; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

5. A composition according to claim 4 wherein the high viscosity vinyl-containing polysiloxane has no more than 25 mole percent phenyl radicals and has the formula

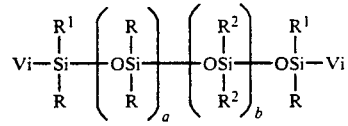

wherein Vi stands for vinyl, $R^1$ is selected from the class consisting of lower alkenyl, alkyl, and aryl radicals and R is selected from the class consisting of monovalent hydrocarbon radicals and halogenated monovalent hydrocarbon radicals, $R^2$ is selected from the class consisting of alkyl, alkenyl, and aryl radicals, "a" varies from 100 to 10,000 and "b" varies from 0 to 300; and the low viscosity vinyl-containing has no more than 25 mole percent phenyl radicals and has the formula

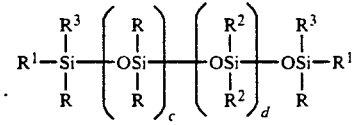

wherein R, $R^1$, and $R^2$ are as previously defined, $R^3$ is selected from the class consisting of alkyl, aryl, and alkenyl radicals, "c" varies from 0 to 500 and "d" varies from 0 to 200.

6. A composition according to claim 4 wherein the magnesium oxide is present at from about 1 to about 8 parts by weight of component (A).

7. A liquid, injection moldable silicone composition comprising:
(A) 100 parts of a first component comprising:
  (1) a blend of vinyl-containing liquid polysiloxanes comprising:
    (a) a high viscosity vinyl-containing organopolysiloxane having a viscosity of from 5000 to 1,000,000 centipoise at 25° C.; and
    (b) a low viscosity vinyl-containing organopolysiloxane having a viscosity of from 50 to 5000 centipoise at 25° C.;
  (2) filler; and
  (3) a dual peroxide catalyst system comprising a high temperature peroxide and a low temperature peroxide, the high temperature peroxide being a peroxide having a ten hour half-life of greater than 110° C. and the low temperature peroxide being a peroxide having a ten hour half-life of 100° C. or below;
(B) from 1 to 100 parts, based on 100 parts of (A), of a hydrogen silicone composition selected from the class consisting of hydrogen containing silanes and hydrogen containing polysiloxanes;
(C) magnesium oxide;
(E) cerium hydroxide or tetramethyldivinyldisilazane; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

8. A composition according to claim 7 wherein the high viscosity vinyl-containing polysiloxane has no more than 25 mole percent phenyl radicals and has the formula

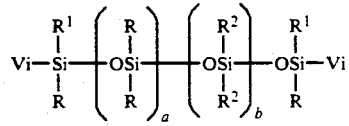

wherein Vi stands for vinyl, $R^1$ is selected from the class consisting of lower alkenyl, alkyl, and aryl radicals and R is selected from the class consisting of monovalent hydrocarbon radicals and halogenated monovalent hydrocarbon radicals, $R^2$ is selected from the class consisting of alkyl, alkenyl, and aryl radicals, "a" varies from 100 to 10,000 and "b" varies from 0 to 300; and the low viscosity vinyl-containing has no more than 25 mole percent phenyl radicals and has the formula

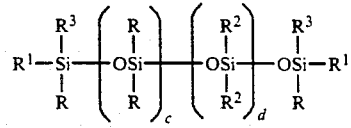

wherein R, $R^1$, and $R^2$ are as previously defined, $R^3$ is selected from the class consisting of alkyl, aryl, and alkenyl radicals, "c" varies from 0 to 500 and "d" varies from 0 to 200.

9. A composition according to claim 7 wherein the high temperature peroxide is 2,5-dimethyl-2,5-di(T-butyl peroxy) hexane and the low temperature peroxide is 1,1-Bis(T-butyl peroxy)-3,3,3-trimethylcyclohexane.

10. A composition according to claim 7 wherein the magnesium oxide is present at from about 1 to about 8 parts by weight of component (A).

11. A process for making a liquid injection moldable silicone composition oil resistant comprising adding (C) magnesium oxide to the liquid injection moldable silicone composition, wherein the liquid injection moldable silicone composition comprises:
(A) 100 parts of a first component comprising:
  (1) a blend of vinyl-containing liquid polysiloxanes comprising:
    (a) a high viscosity vinyl-containing organopolysiloxane having a viscosity of from 5000 to 1,000,000 centipoise at 25° C.; and
    (b) a low viscosity vinyl-containing organopolysiloxane having a viscosity of from 50 to 5000 centipoise at 25° C.;
  (2) filler; and
  (3) a catalyst selected from a platinum catalyst, a peroxide catalyst or dual peroxide catalyst system comprising a high temperature peroxide and a low temperature peroxide, the high temperature peroxide being a peroxide having a ten hour half-life of greater than 110° C. and the low temperature peroxide being a peroxide having a ten hour half-life of 100° C. or below;
(B) from 1 to 100 parts, based on 100 parts of (A), of a hydrogen silicone composition selected from the class consisting of hydrogen containing silanes and hydrogen containing polysiloxanes:
(E) cerium hydroxide or tetramethyldivinyldisilazane; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

12. A process for making a liquid injection moldable silicone composition fuel resistant comprising adding to the liquid injection moldable silicone composition (D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups, wherein the liquid injection moldable silicone composition comprises:

(A) 100 parts of a first component comprising:
  (1) a blend of vinyl-containing liquid polysiloxanes comprising:
    (a) a high viscosity vinyl-containing organopolysiloxane having a viscosity of from 5000 to 1,000,000 centipoise at 25° C.; and
    (b) a low viscosity vinyl-containing organopolysiloxane having a viscosity of from 50 to 5000 centipoise at 25° C.;
  (2) filler; and
  (3) a catalyst selected from a platinum catalyst, a peroxide catalyst, or a dual peroxide catalyst system comprising a high temperature peroxide and a low temperature peroxide, the high temperature peroxide being a peroxide having a ten hour half-life of greater than 110° C. and the low temperature peroxide being a peroxide having a ten hour half-life of 100° C. or below;
(B) from 1 to 100 parts, based on 100 parts of (A), of a hydrogen silicone composition selected from the class consisting of hydrogen containing silanes and hydrogen containing polysiloxanes:
(C) magnesium oxide; and
(E) cerium hydroxide or tetramethyldivinyldisilazane.

13. A process for improving the compression set of a liquid injection moldable silicone composition comprising adding (E) either cerium hydroxide or tetramethyldivinyldisilazane to the liquid injection moldable silicone composition, wherein the liquid injection moldable silicone composition comprises:

(A) 100 parts of a first component comprising:
  (1) a blend of vinyl-containing liquid polysiloxanes comprising:
    (a) a high viscosity vinyl-containing organopolysiloxane having a viscosity of from 5000 to 1,000,000 centipoise at 25° C.; and
    (b) a low viscosity vinyl-containing organopolysiloxane having a viscosity of from 50 to 5000 centipoise at 25° C.;
  (2) filler; and
  (3) a catalyst selected from a platinum catalyst, a peroxide catalyst, or a dual peroxide catalyst system comprising a high temperature peroxide and a low temperature peroxide, the high temperature peroxide being a peroxide having a ten hour half-life of greater than 110° C. and the low temperature peroxide being a peroxide having a ten hour half-life of 100° C. or below;
(B) from 1 to 100 parts, based on 100 parts of (A), of a hydrogen silicone composition selected from the class consisting of hydrogen containing silanes and hydrogen containing polysiloxanes;
(C) magnesium oxide; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1: or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

14. A process for improving the compression set of a liquid injection moldable silicone composition comprising curing the composition with a dual peroxide catalytic system comprising a high temperature peroxide and a low temperature peroxide, the high temperature peroxide being a peroxide having a ten hour half-life of greater than 110° C. and the low temperature peroxide being a peroxide having a ten hour half-life of 100° C. or below, the liquid, injection moldable silicone composition comprising:

(A) 100 parts of a first component comprising:
  (1) a blend of vinyl-containing liquid polysiloxanes comprising:
    (a) a high viscosity vinyl-containing organopolysiloxane having a viscosity of from 5000 to 1,000,000 centipoise at 25° C.; and
    (b) a low viscosity vinyl-containing organopolysiloxane having a viscosity of from 50 to 5000 centipoise at 25° C.; and
  (2) filler:
(B) from 1 to 100 parts, based on 100 parts of (A), of a hydrogen silicone composition selected from the class consisting of hydrogen containing silanes and hydrogen containing polysiloxanes:
(C) magnesium oxide;
(E) cerium hydroxide or tetramethyldivinyldisilazane; and
(D) (1) from 1 to 50 parts by weight of an organopolysiloxane resinous copolymer comprising $R_3^7SiO_{0.5}$ monofunctional units and $SiO_2$ tetrafunctional units, where the ratio of monofunctional units to tetrafunctional units being from 0.5 to 1 to 1 to 1; or (2) from 20 to 50 parts by weight of an organopolysiloxane resinous copolymer comprising $R_3^7SiO_{0.5}$ monofunctional units, $SiO_2$ tetrafunctional units, and $R_2^7SiO$ difunctional units, where the ratio of monofunctional units to tetrafunctional units being from 0.5 to 1 to 1 to 1 and the difunctional units are present in an amount equal to about 1 to 10 mole percent based on the total number of moles of siloxy units in the copolymer; wherein $R^7$ is a member selected from a class of vinyl radicals and monovalent hydrocarbon radicals free of aliphatic unsaturation and wherein the resinous copolymer contains from about 2.5 to 10 mole percent of vinyl groups.

* * * * *